C. GIRARDOT.
NUT LOCK.
APPLICATION FILED JAN. 9, 1909.
931,409.
Patented Aug. 17, 1909.
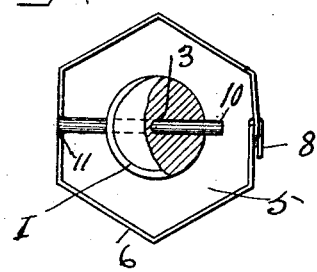
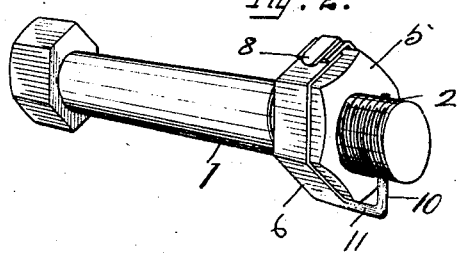
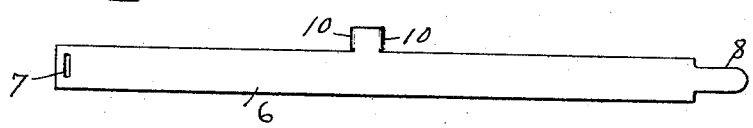
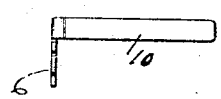
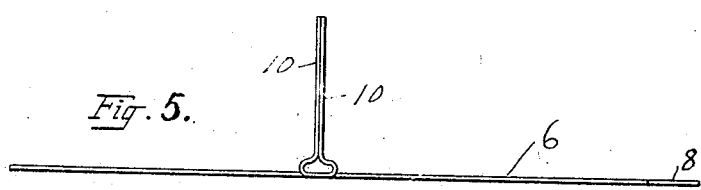
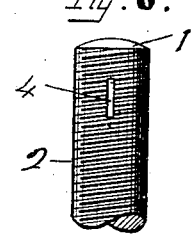
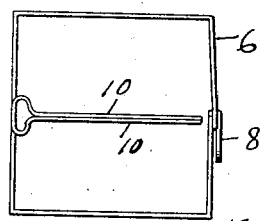
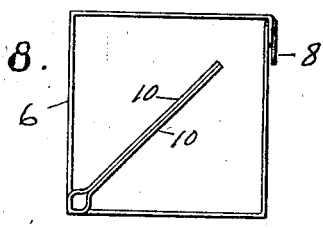
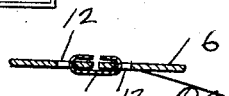
WITNESSES:
J. N. Dickens,
Augusta Viberg.
Charles Girardot INVENTOR.
BY Chapin & Denny
his ATTORNEYS.

UNITED STATES PATENT OFFICE.

CHARLES GIRARDOT, OF FORT WAYNE, INDIANA.

NUT-LOCK.

No. 931,409.　　　　Specification of Letters Patent.　　　Patented Aug. 17, 1909.

Application filed January 9, 1909. Serial No. 471,495.

*To all whom it may concern:*

Be it known that I, CHARLES GIRARDOT, a citizen of the United States, residing at Fort Wayne, in the county of Allen, in the State of Indiana, have invented certain new and useful Improvements in Nut-Locks; and I do hereby declare the following is a full, clear, and exact description of the invention, which will enable others skilled in the art to which it appertains to make and use the same, reference being had to the accompanying drawings, which form part of this specification.

My invention relates to improvements in nut locks.

The primary object of my invention is to provide a cheap, simple and convenient nut locking device, so constructed as to be applied to a nut and bolt in any ordinary situation, and adapted to rigidly secure the nut against turning or getting loose even were all the threads to be stripped off, and adapted to rigidly secure the nut in position by a positive grip in use.

My invention consists of a flexible metal strap or clip adapted to have its ends firmly united when embracing the periphery of the nut, and is provided with a fixed or integral pin bent to a right-angular relation with the axis of the nut, and adapted to pass through a diametric opening in the adjacent end of the bolt.

The novel feature of my invention resides in the construction by which it can be readily applied to the nut in any possible position thereof with equal facility and convenience.

Similar reference numerals indicate like parts throughout the several views in which—

Figure 1 is a view of the invention in position upon a hexagonal nut and the locking pin passed through a diametric opening in the bolt, partly broken away. Fig. 2 is a perspective view of a bolt and nut with my invention applied thereto. Figs. 3, 4 and 5 are plan, end, and side views, respectively, of a modified form of my invention, the locking pin being formed of a folded integral strip. Fig. 6 is a fragmentary detail of a bolt showing the form of diametric opening for the form of locking pin shown in Figs. 3, 4 and 5. Figs. 7 and 8 are side views showing the arrangement of the invention on a four sided nut with the interlocking ends and locking pin in different positions thereon. Fig. 9 is a sectional view showing a modified means for securing the ends of the strap.

The bolt 1 of any proper dimensions, and of any common form, has one end provided with the usual screw-threaded portion 2 having a diametric opening, either circular as shown at 3, in Fig. 1, or consisting of a longitudinal slot 4, Fig. 6. On the screw-threaded portion is mounted a nut 5, preferably hexagonal, Figs. 1 and 2.

My invention consists of a sheet metal strap 6 having a transverse slit 7 at one end thereof, and having its other end provided with terminal tongue 8 having a width slightly less than the length of the said slit, and adapted to form an interlocking union therewith in use.

The strap 6 has a laterally arranged pin formed of two integral similarly bent parallel sheet metal strips 10, of proper width to pass through the slot 4 in the screw-threaded portion of the bolt.

The operation and manner of employing my invention thus described is obvious, and briefly stated is as follows: When the nut 5 has been properly tightened on the bolt 1 the strap 6 is bent to snugly fit the angular sides of the nut, and the pin 9 has its free end bent in right-angular relation with the portion 11 thereof substantially equal in length to the distance between the strap and the said diametric opening in the bolt, after which the free end of the pin 9 is inserted in the opening, and the strap is firmly interlocked at its ends by passing the tongue 8 through the slot 7 and then folding it upon itself as shown in Figs. 3 and 4.

It is obvious that when thus secured in position the nut can not turn or become loosened, and even were the threads of the bolt stripped off, because the pin will prevent displacement of the nut.

When the bolt has a slot 4 instead of a round hole, the pin formed of the strips 10 is inserted in the slot and the strap 6 is then bent to fit the angular sides of the nut as before, and then its ends are interlocked as described, and as shown in Figs. 7 and 8.

If preferred both ends of the strap 6 may be provided with transverse slits 12, Fig. 9, and then united by means of a flexible metal tie 13.

Having thus described my invention what I desire to secure by Letters Patent is:

1. A nut lock consisting of a flexible sheet-metal strap embracing the angular sides of the nut, to keep it from turning, and having its opposite ends united in an interlocking engagement, and provided with an integral lateral pin projecting from one edge of the strap and arranged in right-angular relation to the axis of the nut.

2. The combination of a nut locking device consisting of a flexible sheet-metal strap for embracing the periphery of the nut, and having interlocking ends, and provided with a fixed pin projecting from one edge of the strap for engaging the bolt; a bolt having a diametric opening to receive the said pin; and a nut mounted on the bolt, all substantially as described.

Signed by me at Fort Wayne, Allen county, State of Indiana, this 4th day of January, 1909.

CHARLES GIRARDOT.

Witnesses:
AUGUSTA VIBERG,
AUGUSTE SPIEGEL.